United States Patent
Sun

(10) Patent No.: US 10,755,345 B2
(45) Date of Patent: Aug. 25, 2020

(54) SYSTEM AND METHOD FOR SECURE ACCOUNT TRANSFER

(71) Applicant: Alibaba Group Holding Limited, George Town, Grand Cayman (KY)

(72) Inventor: Jian Sun, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 359 days.

(21) Appl. No.: 14/952,373

(22) Filed: Nov. 25, 2015

(65) Prior Publication Data

US 2016/0162894 A1    Jun. 9, 2016

(30) Foreign Application Priority Data

Dec. 3, 2014  (CN) .......................... 2014 1 0727542

(51) Int. Cl.
  *G06Q 40/02*  (2012.01)
  *G06Q 20/10*  (2012.01)
(52) U.S. Cl.
  CPC ............. *G06Q 40/02* (2013.01); *G06Q 20/10* (2013.01)
(58) Field of Classification Search
  CPC .... G06Q 20/04; G06Q 10/04; G06Q 20/1085; G06Q 20/20; G06Q 10/101; G06F 17/60
  USPC .............................................. 705/39, 40, 44
  See application file for complete search history.

(56) References Cited

U.S. PATENT DOCUMENTS

| | | | |
|---|---|---|---|
| 4,281,391 A | | 7/1981 | Huang |
| 4,731,842 A | * | 3/1988 | Smith .................... G06Q 20/20 380/281 |
| 5,533,123 A | * | 7/1996 | Force ...................... G06F 21/10 380/2 |
| 5,799,087 A | * | 8/1998 | Rosen .................... G06Q 20/02 235/379 |
| 5,937,396 A | * | 8/1999 | Konya ................... G06Q 20/10 705/39 |

(Continued)

FOREIGN PATENT DOCUMENTS

| | | |
|---|---|---|
| CN | 101383032 | 3/2009 |
| CN | 201498035 | 6/2010 |

(Continued)

OTHER PUBLICATIONS

Finzgar, Use of NFC and QR code identification in an electronic ticket system for public transpot, Sep. 15-17, 2011, IEEE, Nov. 1, 2011 (Year: 2011).

*Primary Examiner* — Daniel S Felten
(74) *Attorney, Agent, or Firm* — Shun Yao; Park, Vaughan, Fleming & Dowler LLP

(57) ABSTRACT

One embodiment provides a system that facilitates secure transfer of funds. During operation, the system generates, by a server, an authentication identifier for a payee of a bank account, wherein the authentication identifier indicates the bank account and a corresponding payment account of the payee. The system receives, from a payer, a message which indicates a first command to transfer a payment amount to the payee, wherein the first command includes the authentication identifier. In response to successfully verifying the authentication identifier, the system extracts information associated with the payment account and the bank account from the authentication identifier. The system transfers the payment amount to the bank account of the payee based on the extracted information.

22 Claims, 8 Drawing Sheets

(56) References Cited

U.S. PATENT DOCUMENTS

| | | | | |
|---|---|---|---|---|
| 6,038,549 | A * | 3/2000 | Davis | G06Q 20/04 380/2 |
| 6,526,166 | B1 | 2/2003 | Gorman | |
| 6,697,947 | B1 | 2/2004 | Matyas, Jr. | |
| 6,725,448 | B1 | 4/2004 | Moriya | |
| 6,726,094 | B1 | 4/2004 | Rantze | |
| 7,103,577 | B2 * | 9/2006 | Blair | G06Q 20/02 235/375 |
| 7,130,817 | B2 * | 10/2006 | Karas | G06Q 10/101 705/26.8 |
| 7,149,720 | B2 | 12/2006 | Shepherd | |
| 7,321,874 | B2 | 1/2008 | Dilip | |
| 7,447,663 | B1 * | 11/2008 | Barker | G06Q 20/0855 705/67 |
| 7,617,157 | B2 * | 11/2009 | Seifert | G06Q 20/00 705/43 |
| 7,636,679 | B2 * | 12/2009 | Song | G06Q 20/04 705/35 |
| 7,734,527 | B2 | 6/2010 | Uzo | |
| 7,809,636 | B1 | 10/2010 | Jou | |
| 7,809,762 | B1 | 10/2010 | Parker | |
| 7,877,297 | B2 | 1/2011 | Gould | |
| 7,941,760 | B2 | 5/2011 | Kocienda | |
| 7,946,474 | B1 | 5/2011 | Agrawal | |
| 7,978,900 | B2 | 7/2011 | Nepomniachtchi | |
| 8,090,642 | B1 | 1/2012 | Van Doren | |
| 8,176,324 | B1 | 5/2012 | Krishnamurthy | |
| 8,280,782 | B1 | 10/2012 | Talreja | |
| 8,423,392 | B2 | 4/2013 | Moxley | |
| 8,423,467 | B1 | 4/2013 | Johansson | |
| 8,498,933 | B1 | 7/2013 | Bent | |
| 8,645,295 | B1 | 2/2014 | Dillard | |
| 9,111,073 | B1 | 8/2015 | Jiang | |
| 9,239,722 | B1 | 1/2016 | Calahan | |
| 9,317,850 | B2 * | 4/2016 | Keresman, III | G06Q 20/0855 |
| 9,621,348 | B2 | 4/2017 | Bahjat | |
| 9,715,681 | B2 * | 7/2017 | Hammad | G06Q 20/40 |
| 10,176,478 | B2 * | 1/2019 | Griggs | G06Q 20/20 |
| 10,586,227 | B2 * | 3/2020 | Makhdumi | G06Q 20/204 |
| 2002/0111916 | A1 | 8/2002 | Coronna | |
| 2002/0156687 | A1 | 10/2002 | Carr | |
| 2002/0161466 | A1 * | 10/2002 | Heching | G06Q 10/04 700/103 |
| 2003/0042301 | A1 | 3/2003 | Rajasekaran | |
| 2003/0061172 | A1 | 3/2003 | Robinson | |
| 2003/0200190 | A1 | 10/2003 | Adar | |
| 2004/0139008 | A1 * | 7/2004 | Mascavage, III | G06Q 20/04 705/40 |
| 2004/0153407 | A1 | 8/2004 | Clubb | |
| 2005/0038707 | A1 | 2/2005 | Roever | |
| 2005/0071637 | A1 | 3/2005 | Shirakawa | |
| 2005/0075954 | A1 | 4/2005 | Matsumoto | |
| 2005/0113123 | A1 | 5/2005 | Torvinen | |
| 2005/0144406 | A1 | 6/2005 | Chong, Jr. | |
| 2005/0170856 | A1 | 8/2005 | Keyani | |
| 2005/0240935 | A1 | 10/2005 | Ramanathan | |
| 2006/0010190 | A1 | 1/2006 | Shimbo | |
| 2006/0056626 | A1 | 3/2006 | Keohane | |
| 2006/0069635 | A1 | 3/2006 | Ram | |
| 2006/0089897 | A1 | 4/2006 | Maas | |
| 2006/0176847 | A1 | 8/2006 | Chen | |
| 2006/0220842 | A1 | 10/2006 | Breed | |
| 2006/0271783 | A1 | 11/2006 | Wong | |
| 2007/0035617 | A1 | 2/2007 | Ko | |
| 2007/0043651 | A1 | 2/2007 | Xiao | |
| 2007/0276730 | A1 | 11/2007 | Lee | |
| 2008/0004981 | A1 | 1/2008 | Gopalpur | |
| 2008/0077542 | A1 | 3/2008 | McElhiney | |
| 2008/0097805 | A1 | 4/2008 | Wells | |
| 2008/0119160 | A1 | 5/2008 | Andriantsiferana | |
| 2008/0120160 | A1 | 5/2008 | Woo | |
| 2008/0182586 | A1 | 7/2008 | Aaron | |
| 2008/0228595 | A1 | 9/2008 | Hill | |
| 2008/0306839 | A1 | 12/2008 | Starrs | |
| 2009/0076926 | A1 | 3/2009 | Zinberg | |
| 2009/0090772 | A1 | 4/2009 | Lee | |
| 2009/0094275 | A1 | 4/2009 | Patton | |
| 2009/0106825 | A1 | 4/2009 | Cerruti | |
| 2009/0144451 | A1 | 6/2009 | Cabezas | |
| 2009/0157522 | A1 | 6/2009 | Srinivasan | |
| 2009/0195506 | A1 | 8/2009 | Geidl | |
| 2010/0042600 | A1 | 2/2010 | Orr | |
| 2010/0060585 | A1 | 3/2010 | Chiu | |
| 2010/0073302 | A1 | 3/2010 | Ritzau | |
| 2010/0088026 | A1 | 4/2010 | Manolescu | |
| 2010/0162036 | A1 | 6/2010 | Linden | |
| 2010/0191648 | A1 | 7/2010 | Smith | |
| 2010/0210240 | A1 | 8/2010 | Mahaffey | |
| 2010/0223543 | A1 | 9/2010 | Marston | |
| 2010/0235283 | A1 * | 9/2010 | Gerson | G06Q 20/1085 705/75 |
| 2010/0241575 | A1 | 9/2010 | Cotton | |
| 2010/0250436 | A1 * | 9/2010 | Loevenguth | G06Q 20/02 705/44 |
| 2011/0016520 | A1 | 1/2011 | Cohen | |
| 2011/0093493 | A1 | 4/2011 | Nair | |
| 2011/0125616 | A1 | 5/2011 | Ni | |
| 2011/0125667 | A1 | 5/2011 | Faludi | |
| 2011/0184840 | A1 | 7/2011 | Godard | |
| 2011/0231465 | A1 | 9/2011 | Phatak | |
| 2011/0258027 | A1 | 10/2011 | Lee | |
| 2011/0264598 | A1 | 10/2011 | Fuxman | |
| 2012/0016799 | A1 | 1/2012 | Killian | |
| 2012/0076283 | A1 | 3/2012 | Ajmera | |
| 2012/0101942 | A1 | 4/2012 | Park | |
| 2012/0117271 | A1 | 5/2012 | Kennedy | |
| 2012/0143924 | A1 | 6/2012 | Sethi | |
| 2012/0158467 | A1 | 6/2012 | Hammad | |
| 2012/0198228 | A1 | 8/2012 | Oberheide | |
| 2012/0204256 | A1 | 8/2012 | Craine | |
| 2012/0259774 | A1 | 10/2012 | Marti | |
| 2012/0259783 | A1 | 10/2012 | Kemper | |
| 2012/0284776 | A1 | 11/2012 | Sundaram | |
| 2012/0299831 | A1 | 11/2012 | Lioy | |
| 2012/0323846 | A1 | 12/2012 | Bai | |
| 2013/0066889 | A1 | 3/2013 | Rodriguez | |
| 2013/0067055 | A1 | 3/2013 | Cheng | |
| 2013/0094751 | A1 | 4/2013 | Nepomniachtchi | |
| 2013/0110670 | A1 | 5/2013 | Webber | |
| 2013/0232071 | A1 | 9/2013 | Dilip | |
| 2013/0246172 | A1 | 9/2013 | Moissinac | |
| 2013/0311532 | A1 | 11/2013 | Olsen | |
| 2013/0317895 | A1 | 11/2013 | Turner | |
| 2013/0331130 | A1 | 12/2013 | Lee | |
| 2014/0037184 | A1 | 2/2014 | Gorski | |
| 2014/0052636 | A1 | 2/2014 | Mattes | |
| 2014/0156512 | A1 * | 6/2014 | Rahman | G06Q 20/10 705/39 |
| 2014/0162698 | A1 | 6/2014 | Han | |
| 2014/0164109 | A1 | 6/2014 | Chow | |
| 2014/0173755 | A1 | 6/2014 | Wahl | |
| 2014/0236801 | A1 | 8/2014 | Hansen | |
| 2014/0279525 | A1 | 9/2014 | Mohsenzadeh | |
| 2014/0280910 | A1 | 9/2014 | Swig | |
| 2014/0306896 | A1 | 10/2014 | Sosby | |
| 2014/0310133 | A1 | 10/2014 | Bednar | |
| 2014/0310171 | A1 | 10/2014 | Grossman | |
| 2015/0066679 | A1 | 3/2015 | Mack | |
| 2015/0186989 | A1 | 7/2015 | Kneen | |
| 2015/0220876 | A1 | 8/2015 | Sethi | |
| 2015/0235477 | A1 | 8/2015 | Simkin | |
| 2015/0356288 | A1 | 12/2015 | Guo | |
| 2015/0379460 | A1 | 12/2015 | Zamer | |
| 2015/0381629 | A1 | 12/2015 | O'Sullivan | |
| 2016/0004857 | A1 | 1/2016 | Chen | |
| 2016/0012503 | A1 | 1/2016 | Fu | |
| 2016/0077734 | A1 | 3/2016 | Buxton | |
| 2017/0270598 | A1 | 9/2017 | Ram | |

FOREIGN PATENT DOCUMENTS

| | | |
|---|---|---|
| DE | 102004047258 | 4/2006 |
| EP | 0992949 | 4/2000 |

(56) References Cited

FOREIGN PATENT DOCUMENTS

| | | |
|---|---:|---:|
| EP | 1067471 | 1/2001 |
| JP | 10240690 | 9/1998 |
| JP | 2000082101 | 3/2000 |
| JP | 2001297283 | 10/2001 |
| JP | 2003271851 | 9/2003 |
| JP | 2006259854 | 9/2006 |
| JP | 2007087081 | 4/2007 |
| JP | 2008532112 | 8/2008 |
| JP | 2009020676 | 1/2009 |
| JP | 2010066886 | 3/2010 |
| JP | 2012168616 | 9/2012 |
| JP | 2013235605 | 11/2013 |
| JP | 201441614 | 6/2014 |
| JP | 2014515149 | 6/2014 |
| KR | 20020057906 | 7/2002 |
| KR | 1020020057906 | 7/2002 |
| KR | 1020070034296 | 3/2007 |
| WO | 2012045128 | 4/2012 |
| WO | 2013003372 | 1/2013 |
| WO | 2013149883 | 10/2013 |
| WO | 2017080768 | 5/2017 |

* cited by examiner

SYSTEM AND METHOD FOR SECURE ACCOUNT TRANSFER

RELATED APPLICATION

Under 35 U.S.C. 119, this application claims the benefit and right of priority of Chinese Patent Application No. 201410727542.9, filed 3 Dec. 2014.

BACKGROUND

Field

This disclosure is generally related to financial transactions. More specifically, this disclosure is related to a system and method for secure transfer of funds based on a third-party entity that authenticates the validity of a payee.

Related Art

The progress of technology brings both an increasing convenience and risk to financial transactions. A payer can transfer funds from his bank account to the bank account of a payee by using a variety of computing and mobile devices. In some cases, multiple payers may wish to transfer funds to a single payee, e.g., multiple families paying tuition to a school, or multiple business owners donating funds to a charity or trust account. In these instances, certain payee information, such as the name and bank account number of the payee, may be publicly disclosed. The public disclosure of some payee information can result in security issues. For example, a hacker may obtain a bank account identifier for a person who has the same name (e.g., same first name and same last name) as the intended payee. The hacker can then publish incorrect information over the internet by replacing the bank account identifier for the intended payee with a different bank account identifier for the person with the same name. In another example, a hacker may intercept a packet that contains account information and replace the payee's account identifier with a malicious account identifier. Upon receiving the intercepted packet, a payee's system may remain unaware of the replaced identifier, and proceed with the indicated funds transfer. As a result, in both of these examples, funds may be improperly transferred to the bank account of an unauthorized person. In addition, current methods for account transfer may not allow a payer to state the dedicated purpose for a transfer of funds, which may also result in improper funds transfer.

SUMMARY

One embodiment provides a system that facilitates secure transfer of funds. During operation, the system generates, by a server, an authentication identifier for a payee of a bank account, wherein the authentication identifier indicates the bank account and a corresponding payment account of the payee. The system receives, from a payer, a message which indicates a first command to transfer a payment amount to the payee, wherein the first command includes the authentication identifier. In response to successfully verifying the authentication identifier, the system extracts information associated with the payment account and the bank account from the authentication identifier. The system transfers the payment amount to the bank account of the payee based on the extracted information.

In some embodiments, the system determines the bank account and the corresponding payment account of the payee, and authenticates the bank account and the payment account of the payee.

In some embodiments, the system transmits one or more messages to a payment system which manages the payment account for the payee, wherein the payment system communicates with a banking system which manages the bank account for the payee.

In some embodiments, the system transmits a message which indicates a second command to increase funds in the payment account by the payment amount and to freeze the payment account.

In some embodiments, in response to receiving the second message, the system increases, by a payment system which manages the payment account of the payee, the funds in the payment account by the payment amount. The system also freezes the payment account.

In some embodiments, in response to receiving a confirmation message which indicates a completion of the second command, the system stores in a database a report which includes the payment amount, the payee, and the authentication identifier.

In some embodiments, the system performs a search in the database for one or more reports which include the authentication identifier, based on a predetermined date or time period, wherein a report includes a payment amount. The system calculates a total payment amount for the one or more reports. The system generates a batch number for the one or more reports. The system also transmits a message which indicates a third command to transfer the total payment amount from the payment account of the payee to the bank account of the payee, to unfreeze the payment account, and to deduct the total payment amount from the funds of the payment account.

In some embodiments, in response to receiving a confirmation message which indicates a completion of the third command, the system updates in a database a report which includes the total payment amount, the payee, the authentication identifier, and the batch number.

In some embodiments, in response to receiving the third command, the system generates, by a payment system which manages the payment account of the payee, a message which indicates a fourth command to transfer the total payment amount from the payment account to the bank account of the payee. The system unfreezes the payment account. The system deducts the total payment account from the funds of the payment account. The system also transmits a confirmation message to the server which indicates a completion of the third command.

In some embodiments, the system authenticates, by the payment system, the bank account of the payee.

In some embodiments, the system generates, by a server, a first authentication identifier for a payee, wherein the first authentication identifier is associated with a payment account of the payee and stored in the server. The system receives, from a payer, a request to transfer a payment amount to the payee, wherein the request includes a second authentication identifier. Upon successfully matching the second authentication identifier with the first authentication identifier, the server extracts the payment account based on the first authentication identifier. The system transfers the payment amount to the payment account of the payee.

In some embodiments, the system provides that the payment account of the payee at the third party system is coupled to the bank account of the payee at the bank system. The system generates a first authentication identifier for the payee at the third party system, wherein the first authentication identifier is associated with the bank account of the payee and stored in the third party system. The system receives, from a payer, a request to transfer a payment amount to the payee, wherein the request includes a second authentication identifier. Upon successfully matching the second authentication identifier with the first authentication identifier at the third party system, the system extracts the coupled bank account of the payee at the bank system, and transfers the payment amount to the bank account of the payee.

BRIEF DESCRIPTION OF THE FIGURES

In the figures, like reference numerals refer to the same figure elements.

DETAILED DESCRIPTION

Figure 1A:
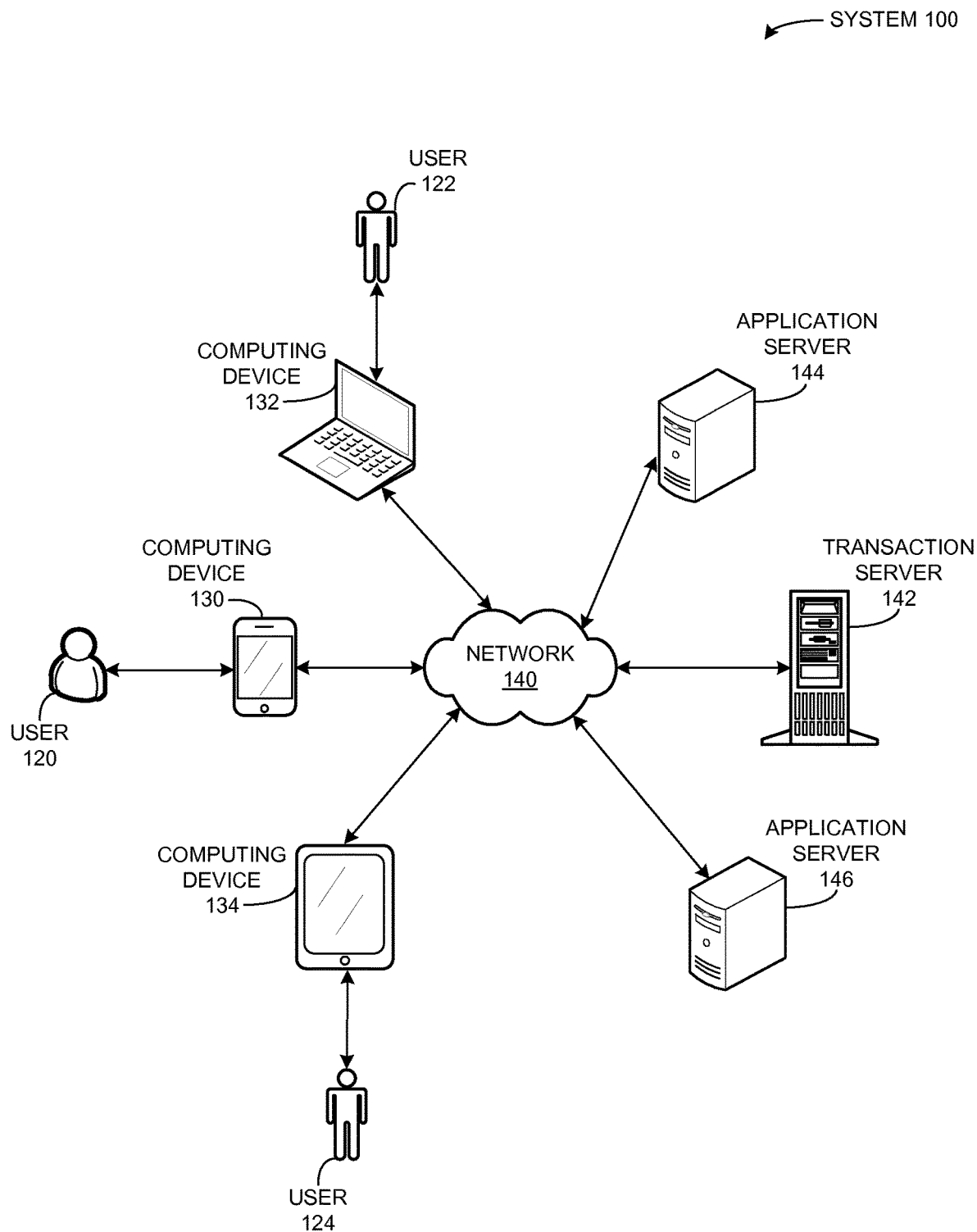
FIG. 1A illustrates an exemplary computing system that facilitates secure transfer of funds, in accordance with an embodiment of the present application.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention solve the problem of improper funds transfer by providing a system which validates the authenticity of a payee, enables freezing of the appropriate payment account, and facilitates automatic funds transfer from the payment account to the corresponding bank account. Improper funds transfer can occur when certain information of a payee is publicly disclosed. For example, if the name and bank account number of a payee are known, a hacker can replace the payee's bank account number with the bank account number for a person with the same name as the payee. In another example, a hacker can intercept a packet that contains a bank account number for the payee and insert in a bank account number for an unauthorized person. Both of these situations may result in improper funds transfer.

The present system addresses these security issues by providing a system which acts as a third-party and provides validation of the payee's authenticity. The system generates a unique authentication identifier for the payee and provides the unique identifier to the payer. This allows the payer to transfer funds to the payee based on the unique identifier, without using the name or account number of the payee. The present system may refer to a third-party payment system provided by a third-party payment service provider, such as Alipay or Paypal. The third-party payment system which includes a payment account is coupled to a bank system which includes a bank account of the payee. As a result, the payee does not need to disclose information (such as the payee's name and bank account number) which may be used to facilitate improper funds transfer. The system also enables a payment system to transfer funds to and freeze the payee's payment account ("payment account transfer"), run a periodic batch report, and automatically transfer all funds associated with the identifier from the payee's payment account to the payee's bank account ("bank account transfer"). The system can generate reports detailing the payments made to the payee with respect to both the payment account transfer and the subsequent automatic bank account transfer. These features aid in preventing improper funds transfer.

In some embodiments, the system can set an expiration time for the identifier and prevent the payer from transferring funds if the identifier is expired. The system can also generate a verification code that may only be used for a predetermined number of times, and send the code to the payer. In addition, the system can provide the payer with an option to enter a short description or summary of the reason for the fund transfer. The system can subsequently review the entered description and compare it against the generated reports.

FIG. 1A illustrates an exemplary computing system that facilitates secure transfer of funds, in accordance with an embodiment of the present application. In this example, system 100 can include computing devices 130, 132, and 134, which are associated with users 120, 122, and 124, respectively. Computing devices 130-134 can include, for example, a tablet, a mobile phone, an electronic reader, a laptop computer, a desktop computer, or any other computing device. Computing devices 130-134 can communicate with a transaction server 142 (e.g., a server device which provides authentication services for a financial transaction) and application servers 142 and 144 (e.g., servers or systems which manage payment accounts or bank accounts of a user) via a network 140.

During operation, user 120 interacts with corresponding computing device 130. For example, user 120 may browse to a website for a payment system or a banking system via a web browser running on mobile device 130. User 120 may indicate on device 130 a payment (e.g., a transfer of funds) to a specific payee. Based on the user information for user 120, the system can provide an authentication identifier to user 120 for use in transferring funds to the payee. In some embodiments, the payee may previously provide to the system a list of payers authorized to receive the authentication identifier. The authentication identifier can be, e.g., a digital certificate or a string of numbers of characters. The user then sends the authentication identifier and the payment amount to transaction server 142, which validates the authentication identifier. Server 142 can be a third-party which provides authentication services to users who wish to transfer funds to certain payees. Server 142 can extract from the authentication identifier the corresponding payment account and bank account of the payee. Server 142 can then initiate a transfer of the payment to the payee.

Server 142 can communicate with application server 144, which can be a system that manages the payment account of the payee ("payment server"). Application server 144 can communicate with application server 146, which can be a system that manages the bank account of the payee ("bank server"). For example, server 142 can send a message to payment server 144 to process the payment amount, which can result in payment server 144 increasing the funds of the payment account by the payment amount, and subsequently freezing the payment account, such that no changes may be made to the amount of the funds in the payment account. Payment server 144 can notify server 142 of the increase and freeze, and server 142 can generate a report which indicates the payment amount, the payee, and the authentication identifier.

At a later time (e.g., at midnight each day when server 142 is set to run its daily batch report), server 142 can search for reports associated with the authentication identifier and generate a batch number for the reports. Server 142 can send a message to payment server 144 to transfer a total payment amount associated with the batch number. Payment server 144 can transfer the funds to bank server 146, which can in turn send a confirmation message of a successful transaction. The confirmation message can also be sent to server 142. Payment server 144 can also decrease the funds of the payment account by the total payment amount, and subsequently unfreeze the payment account. Server 142 can then generate a report which indicates the total payment amount, the payee, the authentication identifier, and the batch number.

Thus, system 100 depicts a system that facilitates secure funds transfer to a payee based on a third-party which provides a unique identifier for the payee and subsequent validation for the unique identifier. The third party can also generate reports and communicate with systems which manage the payment account and bank account of the payee.

Figure 1B:
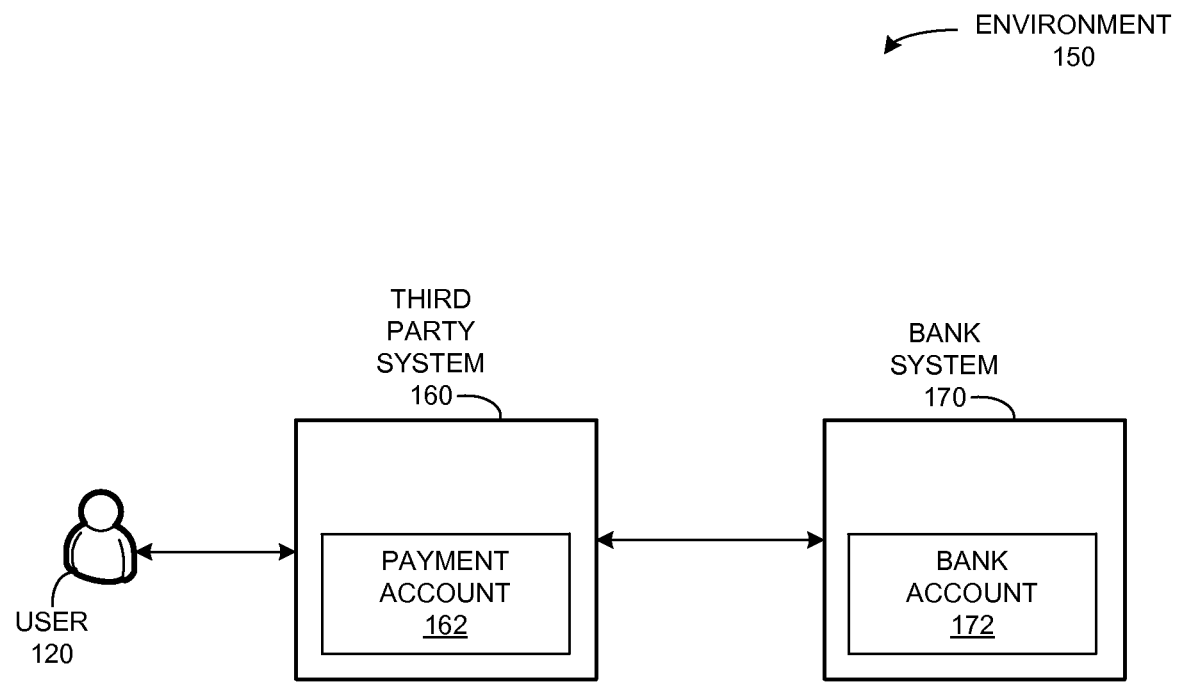
FIG. 1B illustrates an exemplary computing environment that facilitates secure transfer of funds, in accordance with an embodiment of the present application.

FIG. 1B illustrates an exemplary computing environment 150 that facilitates secure transfer of funds, in accordance with an embodiment of the present application. Environment 150 can include user 120, a third party system 160, and a bank system 170. Third party system 160 can include a payment account 162 of a payee, and bank system 170 can include a bank account 172 of the payee. Third party system 160 and bank system 170 can be independent systems, and each of payment account 162 and bank account 172 can be associated with or belong to the respective independent system. Third party system 160 can perform the functionality described in relation to server 142 and payment server 144 of FIG. 1A, and bank system 170 can perform the functionality described in relation to bank server 146 of FIG. 1A.

General Method for Securely Transferring Funds

Figure 2:
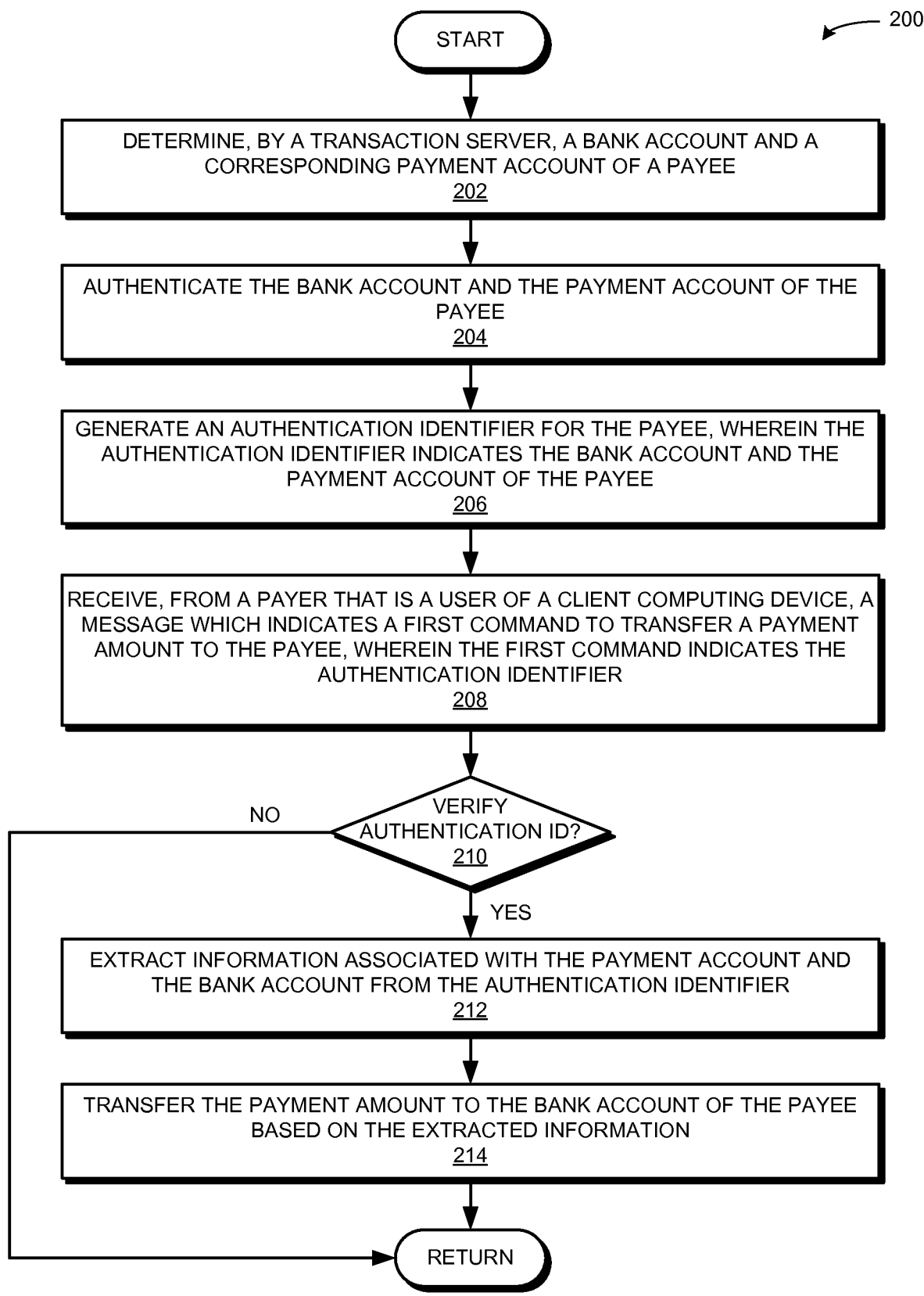
FIG. 2 presents a flowchart illustrating a method by a transaction server for securely transferring funds, in accordance with an embodiment of the present application.

FIG. 2 presents a flowchart 200 illustrating a method by a transaction server for securely transferring funds, in accordance with an embodiment of the present application. During operation, the system determines, by the transaction server, a bank account and a corresponding payment account of a payee (operation 202). The server authenticates the bank account and the payment account of the payee (operation 204). The server generates an authentication identifier for the payee, where the authentication identifier indicates the bank account and the payment account of the payee (operation 206). The authentication identifier is a unique identifier which can be, e.g., a digital certificate or a string of numbers, and can indicate or correspond to the payment account and the bank account. Subsequently, the server receives, from a payer that is a user of a client computing device, a message which indicates a first command to transfer a payment amount to the payee (operation 208). The first command indicates the authentication identifier. As described above in relation to FIG. 1, the payer, in possession of the authentication identifier, can send the identifier and the payment amount in the command to transfer funds to the payee.

The server verifies the authentication identifier (decision 210). In some instances, the verification includes checking whether an expiration time for the authentication identifier has been reached. In some instances, the verification includes checking whether the authentication identifier sent by the payer successfully matches the authentication identifier generated for the payee. If the server does not successfully verify the identifier, the operation returns. If the server does successfully verify the identifier, the server extracts information associated with the payment account and the bank account from the authentication identifier (operation 212). For example, the server can extract the account number or other identifier for the payment account and the bank account. Finally, the server transfers the payment amount to the bank account of the payee based on the extracted information (operation 214). Operation 214 can include the operations described below in FIGS. 3, 4A, and 4B.

Server Communication with Payment System to Transfer Funds

Figure 3:
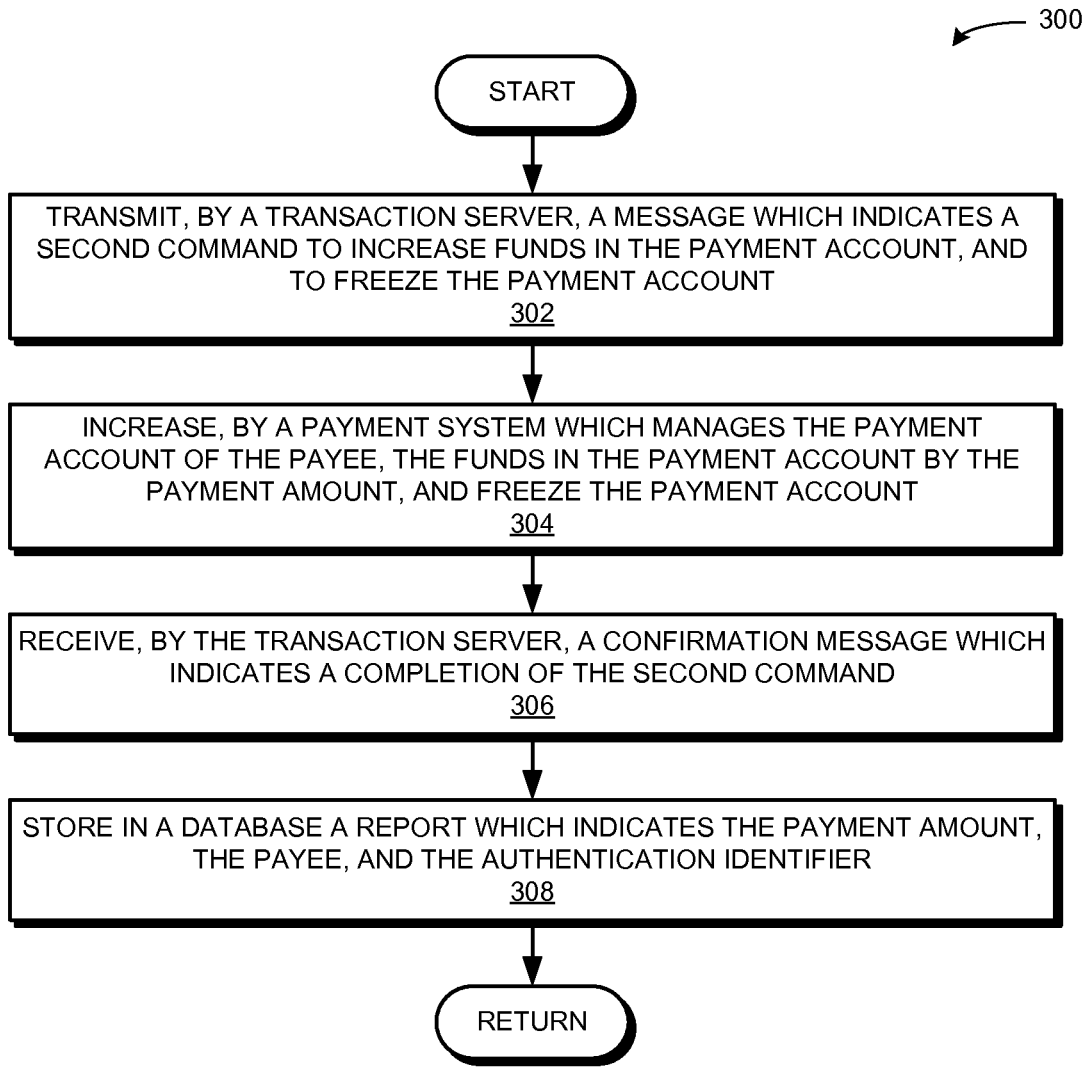
FIG. 3 presents a flowchart illustrating a method by a transaction server for securely transferring funds, including interaction with a payment system, in accordance with an embodiment of the present application.

FIG. 3 presents a flowchart 300 illustrating a method by a transaction server for securely transferring funds, including interaction with a payment system, in accordance with an embodiment of the present application. During operation, the system transmits, by the transaction server, a message which indicates a second command to increase funds in the payment account and to freeze the payment account (operation 302). The system increases, by a payment system which manages the payment account of the payee, the funds in the payment account by the payment amount, and freezes the payment account (operation 304). Subsequently, the server receives from the payment system a confirmation message which indicates a completion of the second command (operation 306). The server stores in a database a report which indicates the payment amount, the payee, and the authentication identifier (operation 308).

Figure 4A:
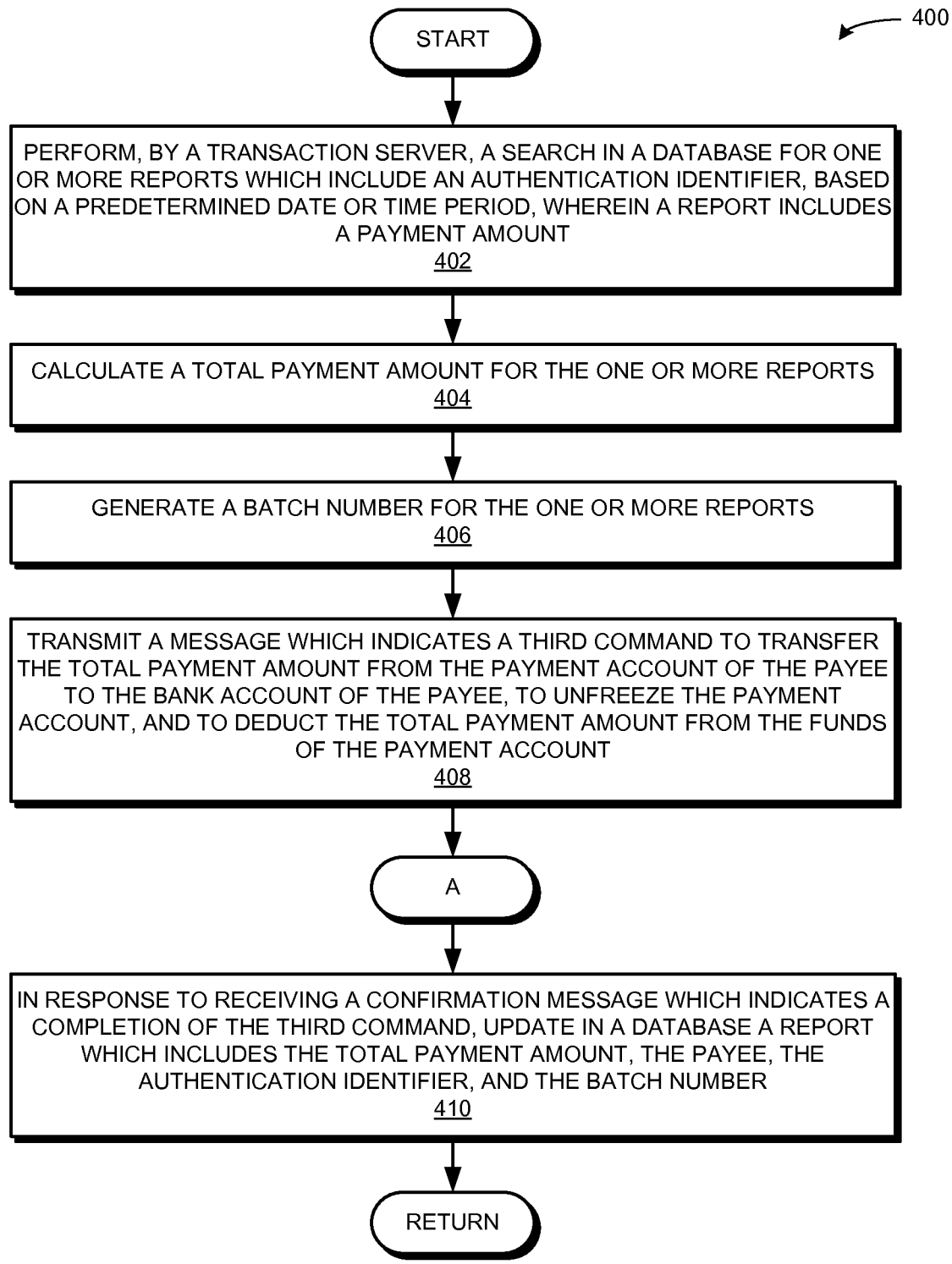
FIG. 4A presents a flowchart illustrating a method by a transaction server for summarizing and processing a secure transfer of funds, including interaction with a payment system, in accordance with an embodiment of the present application.

FIG. 4A presents a flowchart 400 illustrating a method by a transaction server for summarizing and processing a secure transfer of funds, including interaction with a payment system, in accordance with an embodiment of the present application. During operation, the server performs a search in a database for one or more reports which include an authentication identifier, based on a predetermined date or time period (operation 402). A report includes a payment amount, and the predetermined date or time period can be, e.g., a 24-hour period for a certain date. The server calculates a total payment amount for the one or more reports based on the payment amount included in each report in the search result (operation 404). The server generates a batch number for the one or more reports (operation 406). The server transmits a message which indicates a third command to transfer the total payment amount from the payment account of the payee to the bank account of the payee (operation 408). The third command also includes instructions to unfreeze the payment account and to deduct the total payment amount from the funds of the payment account. The operation then continues as described at Label A of FIG.

4B (e.g., a method performed by the payment system). In response to receiving a confirmation message which indicates a completion of the third command, the server updates in a database a report which includes the total payment amount, the payee, the authentication identifier, and the batch number (operation 410).

Figure 4B:
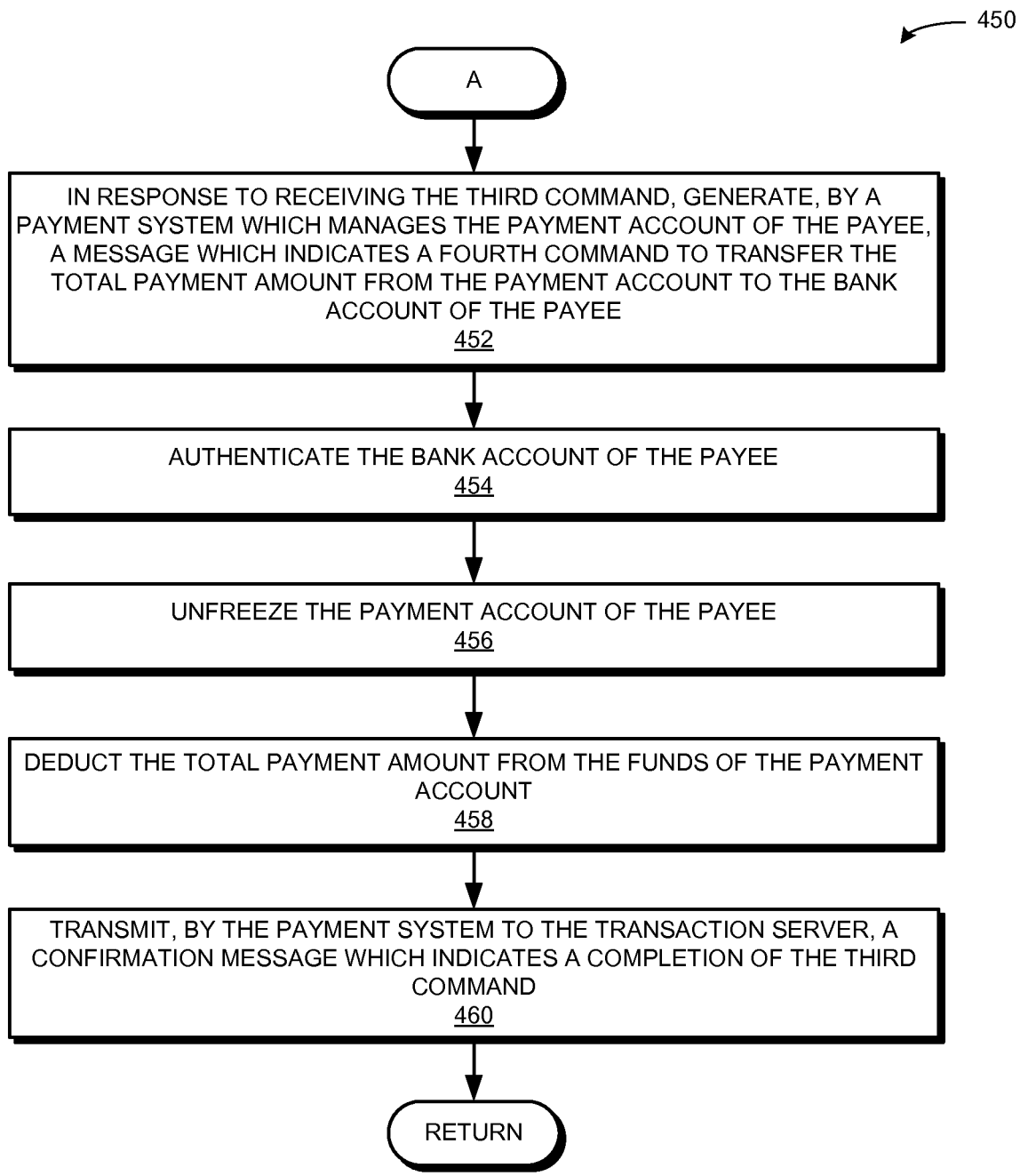
FIG. 4B presents a flowchart illustrating a method by a payment system for processing a secure transfer of funds, in accordance with an embodiment of the present application.

FIG. 4B presents a flowchart 450 illustrating a method by a payment system for processing a secure transfer of funds, in accordance with an embodiment of the present application. In response to receiving the third command, a payment system which manages the payment account of the payee generates a message which indicates a fourth command to transfer the total payment amount from the payment account to the bank account of the payee (operation 452). The payment system authenticates the bank account of the payee (operation 454). Upon authenticating the bank account of the payee, the payment system unfreezes the payment account of the payee (operation 456) and deducts the total payment amount from the funds of the payment account (operation 458). Finally, the payment system transmits to the server a confirmation message which indicates a completion of the third command (operation 460).

Exemplary Apparatus and Computer System

Figure 5:
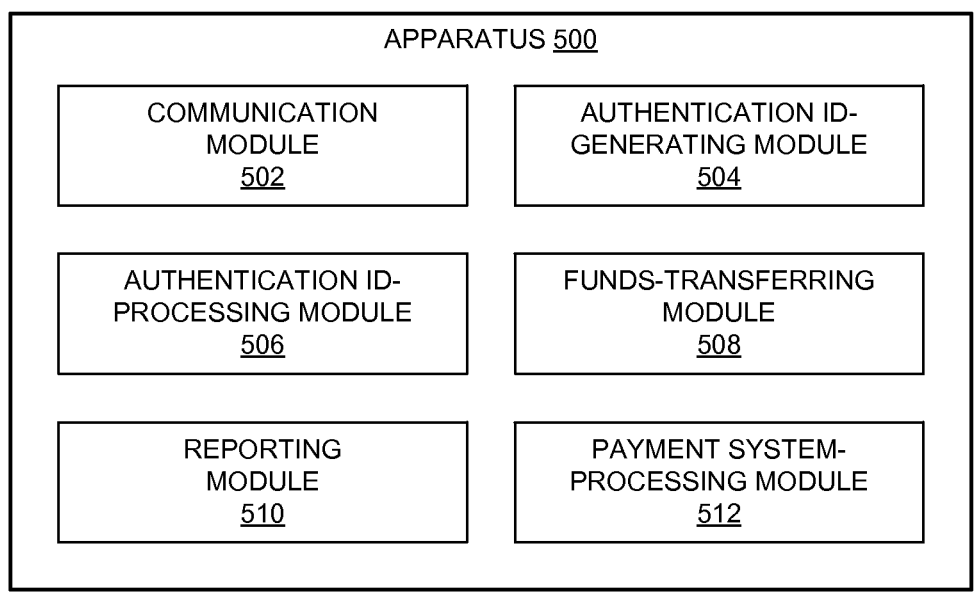
FIG. 5 illustrates an exemplary apparatus that facilitates secure transfer of funds, in accordance with an embodiment of the present application.

FIG. 5 illustrates an exemplary apparatus 500 that facilitates secure transfer of funds, in accordance with an embodiment of the present application. Apparatus 500 can comprise a plurality of modules which may communicate with one another via a wired or wireless communication channel. Apparatus 500 may be realized using one or more integrated circuits, and may include fewer or more modules than those shown in FIG. 5. Further, apparatus 500 may be integrated in a computer system, or realized as a separate device which is capable of communicating with other computer systems and/or devices. Specifically, apparatus 500 can comprise a communication module 502, an authentication identifier-generating module 504, an authentication identifier-processing module 506, a funds-transferring module 508, a reporting module 510, and a payment system-processing module 512.

In some embodiments, communication module 502 can send and/or receive data packets to/from other network nodes across a computer network, where a data packet can correspond to a first command to transfer a payment amount to a payee. Authentication identifier-generating module 504 can generate an authentication identifier for a payee of a bank account, where the authentication identifier indicates the bank account and a corresponding payment account of the payee. The authentication identifier can be a first authentication identifier associated with the payment account of the payee or associated with the bank account of the payee.

In response to successfully verifying the authentication identifier, authentication identifier-processing module 506 can extract information associated with the payment account and the bank account from the authentication identifier. Funds-transferring module 508 can transfer the payment amount to the bank account of the payee based on the extracted information. In addition, authentication identifier-generating module 504 can determine the bank account and corresponding payment account of the payee. Authentication identifier-processing module 506 can authenticate the bank account and payment account of the payee. Communication module 502 can also receive a request to transfer a payment amount to the payee, where the request includes a second authentication identifier. Authentication identifier-processing module 506 can successfully match the second authentication identifier to the first authentication identifier. Authentication identifier-processing module 506 can extract the payment account based on the first authentication identifier, and extract the coupled bank account of the payee.

Communication module 502 can transmit a message which indicates a second command to increase funds in the payment account by the payment amount and to freeze the payment account. Payment system-processing module 512 can increase the funds in the payment account by the payment amount and freeze the payment account.

Reporting module 510 can store in a database a report which includes the payment amount, the payee, and the authentication identifier. Reporting module 510 can also perform a search in the database for one or more reports which include the authentication identifier, based on a predetermined date or time period, wherein a report includes a payment amount. Reporting module 510 can calculate a total payment amount for the one or more reports, and generate a batch number for the one or more reports.

Communication module 502 can transmit a message which indicates a third command to transfer the total payment amount from the payment account of the payee to the bank account of the payee, to unfreeze the payment account, and to deduct the total payment amount from the funds of the payment account. Payment system-processing module 512 can authenticate the bank account of the payee, unfreeze the payment account, decrease the funds in the payment account by the total payment amount, and transmit a message which indicates a completion of the third command. In response to receiving a confirmation message which indicates a completion of the third command, reporting module 510 can update in a database a report which includes the total payment amount, the payee, the authentication identifier, and the batch number. Communication module 502 can receive a confirmation message which indicates a completion of the third command.

Figure 6:
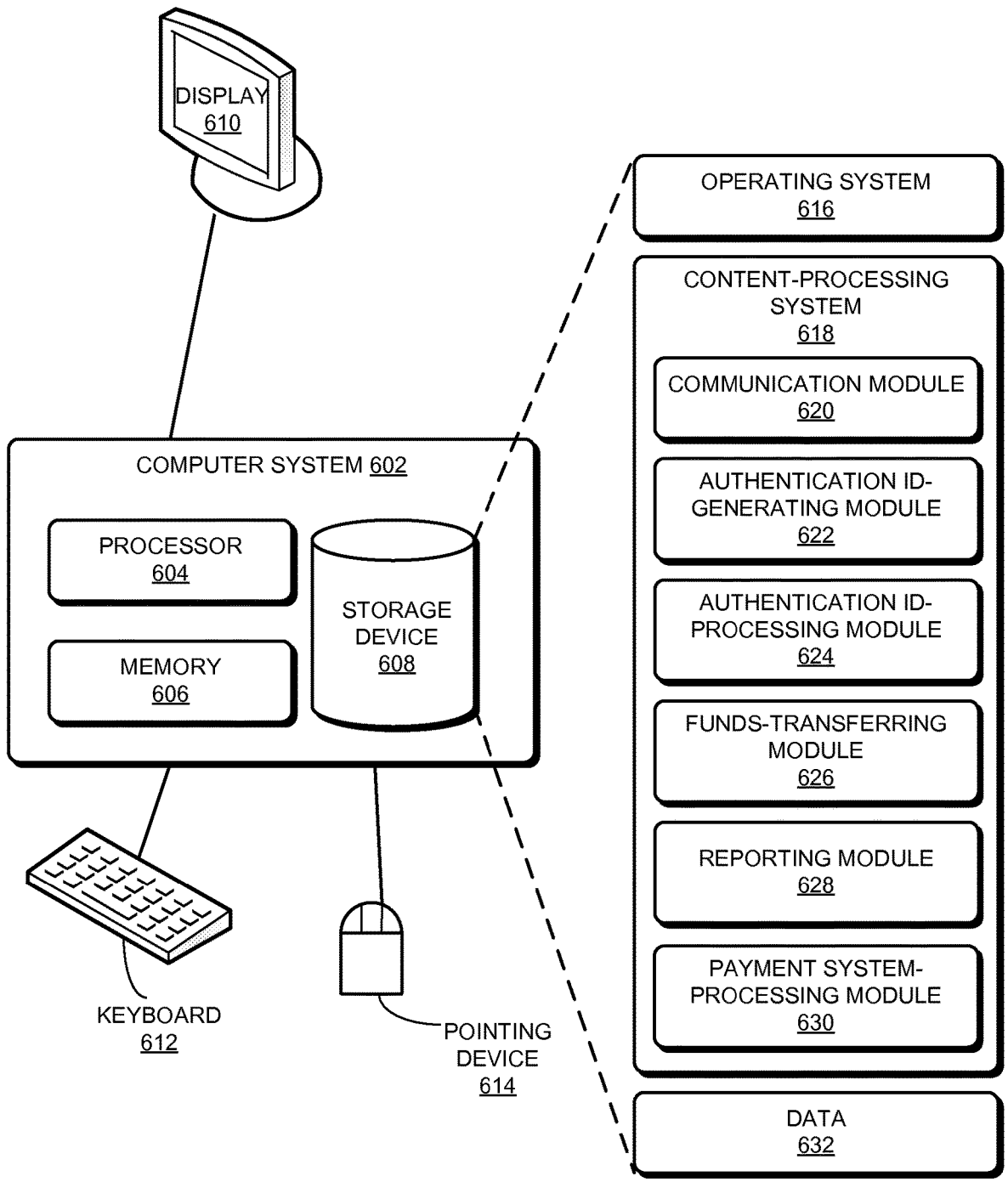
FIG. 6 illustrates an exemplary computer system that facilitates secure transfer of funds, in accordance with an embodiment of the present application.

FIG. 6 illustrates an exemplary computer system 602 that facilitates control of the display direction of content on a device, in accordance with an embodiment of the present application. Computer system 602 includes a processor 604, a memory 606, and a storage device 608. Memory 606 can include a volatile memory (e.g., RAM) that serves as a managed memory, and can be used to store one or more memory pools. Furthermore, computer system 602 can be coupled to a display device 610, a keyboard 612, and a pointing device 614. Storage device 608 can store an operating system 616, a content-processing system 618, and data 632.

Content-processing system 618 can include instructions, which when executed by computer system 602, can cause computer system 602 to perform methods and/or processes described in this disclosure. Specifically, content-processing system 618 may include instructions for sending and/or receiving data packets to/from other network nodes across a computer network, where a data packet can correspond to a first command to transfer a payment amount to a payee (communication module 620). Content-processing system 618 can include instructions for generating an authentication identifier for a payee of a bank account, where the authentication identifier indicates the bank account and a corresponding payment account of the payee (authentication identifier-generating module 622). The authentication identifier can be a first authentication identifier associated with the payment account of the payee or associated with the bank account of the payee.

Content-processing system 618 can also include instructions for, in response to successfully verifying the authentication identifier, extracting information associated with the payment account and the bank account from the authentication identifier (authentication identifier-processing module 624). Content-processing system 618 can include instructions for transferring the payment amount to the bank account of the payee based on the extracted information (funds-transferring module 626). Content-processing system 618 can include instructions for determining the bank account and corresponding payment account of the payee (authentication identifier-generating module 622) and for authenticating the bank account and payment account of the payee (authentication identifier-processing module 624). Content-processing system 618 can further include instructions for receiving a request to transfer a payment amount to the payee, where the request includes a second authentication identifier (communication module 620). Content-processing system 618 can include instructions for successfully matching the second authentication identifier to the first authentication identifier (authentication identifier-processing module 624). Content-processing system 618 can also include instructions for extracting the payment account based on the first authentication identifier, and for extracting the coupled bank account of the payee (authentication identifier-processing module 624).

Content-processing system 618 can additionally include instructions for transmitting a message which indicates a second command to increase funds in the payment account by the payment amount and to freeze the payment account (communication module 620). Content-processing system 618 can include instructions for increasing the funds in the payment account by the payment amount and freeze the payment account (payment system-processing module 630).

Content-processing system 618 can include instructions for storing in a database a report which includes the payment amount, the payee, and the authentication identifier, and for performing a search in the database for one or more reports which include the authentication identifier, based on a predetermined date or time period, where a report includes a payment amount (reporting module 628). Content-processing system 618 can include instructions for calculating a total payment amount for the one or more reports, and for generating a batch number for the one or more reports (reporting module 628).

Additionally, content-processing system 618 can include instructions for transmitting a message which indicates a third command to transfer the total payment amount from the payment account of the payee to the bank account of the payee, to unfreeze the payment account, and to deduct the total payment amount from the funds of the payment account (communication module 620). Content-processing system 618 can include instructions for authenticating the bank account of the payee, unfreezing the payment account, decreasing the funds in the payment account by the total payment amount, and transmitting a message which indicates a completion of the third command (payment system-processing module 6300. Content-processing system 618 can include instructions for, in response to receiving a confirmation message which indicates a completion of the third command, updating in a database a report which includes the total payment amount, the payee, the authentication identifier, and the batch number (reporting module 628). Content-processing system 618 can include instructions for receiving a confirmation message which indicates a completion of the third command (communication module 620).

Data 632 can include any data that is required as input or that is generated as output by the methods and/or processes described in this disclosure. Specifically, data 632 can store at least: an authentication identifier; information which indicates a payment account and a corresponding bank account; one or more commands; a payment amount; information indicating a payer and a payee; one or more reports that indicate a payment amount, a payee, an authentication identifier, and a total payment amount; a total payment amount; information to communicate with a system which manages a payment account and/or a bank account of a payee; and a database that stores one or more reports.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer system for securely transferring funds to a payee, the system comprising:
   a processor; and
   a memory coupled to the processor and storing instructions, which when executed by the processor cause the processor to perform a method, the method comprising:
      generating, by the computer system, a first authentication identifier for a payee of a bank account managed by a bank system,
      wherein an authentication identifier is a unique identifier generated for a respective payee and which:
         prevents interception of a packet that contains personal information which, when disclosed, results in a first improper funds transfer; and
         prevents a subsequent replacement of the packet with inaccurate information which results in a second improper funds transfer,
      wherein the payee has a payment account managed by the computer system, wherein the first authentication identifier indicates both the bank account and a payment account of the payee, wherein the first authentication identifier allows a payer to transfer funds to the payee without using the personal information, and wherein the payment account corresponds to the bank account;
generating, by the payer on a client computing device, a message which indicates a first command to transfer a payment amount to the payee, wherein the first command includes a second authentication identifier previously generated by the computer system;
receiving, from the payer, the message which indicates the first command including the second authentication identifier;
in response to successfully verifying the second authentication identifier, extracting information associated with the payment account and the bank account from the second authentication identifier; and
transferring, by the computer system to the bank system, the payment amount to the bank account of the payee based on the extracted information, which comprises:
transmitting a message which indicates a second command to increase funds in the payment account by the payment amount and to freeze the payment account;
increasing, by the computer system or by a payment system which manages the payment account of the payee, the funds in the payment account by the payment amount; and
freezing the payment account,
thereby enhancing security of the computer system by allowing the payee to avoid disclosing the personal information that results in the first or the second improper funds transfer.

2. The computer system of claim 1, wherein generating the first authentication identifier comprises:
determining the bank account and the corresponding payment account of the payee; and
authenticating the bank account and the payment account of the payee.

3. The computer system of claim 1, wherein transferring the payment amount to the bank account of the payee further comprises:
transmitting one or more messages to a payment system which manages the payment account for the payee, wherein the payment system communicates with the bank system which manages the bank account for the payee.

4. The computer system of claim 1, wherein the second authentication identifier, when successfully verified, allows the payer to transfer funds to the payee without using the personal information.

5. The computer system of claim 1, wherein successfully verifying the second authentication identifier comprises:
determining that the second authentication identifier matches the first authentication identifier for the payee.

6. The computer system of claim 1, wherein the method further comprises:
in response to receiving a confirmation message which indicates a completion of the second command, storing in a database a report which includes the payment amount, the payee, and the second authentication identifier.

7. The computer system of claim 1, wherein transferring the payment amount to the bank account of the payee further comprises:
performing a search in a database for one or more reports which include the second authentication identifier, based on a predetermined date or time period, wherein a report includes a payment amount;
calculating a total payment amount for the one or more reports;
generating a batch number for the one or more reports; and
transmitting a message which indicates a third command to transfer the total payment amount from the payment account of the payee to the bank account of the payee, to unfreeze the payment account, and to deduct the total payment amount from the funds of the payment account.

8. The computer system of claim 7, wherein the method further comprises:
in response to receiving a confirmation message which indicates a completion of the third command, updating in the database a report which includes the total payment amount, the payee, the second authentication identifier, and the batch number.

9. The computer system of claim 7, wherein in response to receiving the third command, the method further comprises:
generating, by the computer system or by a payment system which manages the payment account of the payee, a message which indicates a fourth command to transfer the total payment amount from the payment account to the bank account of the payee;
unfreezing the payment account;
deducting the total payment account from the funds of the payment account; and
transmitting a confirmation message to the computer system which indicates a completion of the third command.

10. The computer system of claim 9, wherein generating the fourth command further comprises:
authenticating, by the computer system or by the payment system, the bank account of the payee.

11. A computer-implemented method for securely transferring funds to a payee, the method comprising:
generating, by a server, a first authentication identifier for a payee of a bank account managed by a bank system, wherein an authentication identifier is a unique identifier generated for a respective payee and which:
prevents interception of a packet that contains personal information which, when disclosed, results in a first improper funds transfer; and
prevents a subsequent replacement of the packet with inaccurate information which results in a second improper funds transfer,
wherein the payee has a payment account managed by the server, wherein the first authentication identifier indicates both the bank account and a payment account of the payee, wherein the first authentication identifier allows a payer to transfer funds to the payee without using the personal information, and wherein the payment account corresponds to the bank account;
generating, by the payer on a client computing device, a message which indicates a first command to transfer a payment amount to the payee, wherein the first command includes a second authentication identifier previously generated by the server;
receiving, from the payer, the message which indicates the first command including the second authentication identifier;
in response to successfully verifying the second authentication identifier, extracting information associated with the payment account and the bank account from the second authentication identifier; and transferring, by the server to the bank system, the payment amount to the bank account of the payee based on the extracted information, which comprises:
transmitting a message which indicates a second command to increase funds in the payment account by the payment amount and to freeze the payment account;
increasing, by the computer system or by a payment system which manages the payment account of the payee, the funds in the payment account by the payment amount; and
freezing the payment account, thereby enhancing security of the server by allowing the payee to avoid disclosing the personal information that results in the first or the second improper funds transfer.

12. The method of claim 11, wherein generating the first authentication identifier comprises:
determining the bank account and the corresponding payment account of the payee; and
authenticating the bank account and the payment account of the payee.

13. The method of claim 11, wherein transferring the payment amount to the bank account of the payee further comprises:
transmitting one or more messages to a payment system which manages the payment account for the payee, wherein the payment system communicates with the bank system which manages the bank account for the payee.

14. The method of claim 11, wherein the second authentication identifier, when successfully verified, allows the payer to transfer funds to the payee without using the personal information.

15. The method of claim 1, wherein successfully verifying the second authentication identifier comprises:
determining that the second authentication identifier matches the first authentication identifier for the payee.

16. The method of claim 1, further comprising:
in response to receiving a confirmation message which indicates a completion of the second command, storing in a database a report which includes the payment amount, the payee, and the second authentication identifier.

17. The method of claim 11, wherein transferring the payment amount to the bank account of the payee further comprises:
performing a search in a database for one or more reports which include the second authentication identifier, based on a predetermined date or time period, wherein a report includes a payment amount;
calculating a total payment amount for the one or more reports;
generating a batch number for the one or more reports; and
transmitting a message which indicates a third command to transfer the total payment amount from the payment account of the payee to the bank account of the payee, to unfreeze the payment account, and to deduct the total payment amount from the funds of the payment account.

18. The method of claim 17, further comprising:
in response to receiving a confirmation message which indicates a completion of the third command, updating in the database a report which includes the total payment amount, the payee, the second authentication identifier, and the batch number.

19. The method of claim 17, wherein in response to receiving the third command, the method further comprises:
generating, by the server or by a payment system which manages the payment account of the payee, a message which indicates a fourth command to transfer the total payment amount from the payment account to the bank account of the payee;
unfreezing the payment account;
deducting the total payment account from the funds of the payment account; and
transmitting a confirmation message to the server which indicates a completion of the third command.

20. The method of claim 19, wherein generating the fourth command further comprises:
authenticating, by the server or by the payment system, the bank account of the payee.

21. A computer system for securely transferring funds to a payee, the system comprising:
a processor; and
a memory coupled to the processor and storing instructions, which when executed by the processor cause the processor to perform a method, the method comprising:
generating, by a server, a first authentication identifier for a payee,
wherein an authentication identifier is a unique identifier generated for a respective payee and which:
prevents interception of a packet that contains personal information which, when disclosed, results in a first improper funds transfer; and
prevents a subsequent replacement of the packet with inaccurate information which results in a second improper funds transfer,
wherein the first authentication identifier is associated with a payment account of the payee and stored in the server, wherein the first authentication identifier indicates both a bank account and a corresponding payment account of the payee, and wherein the first authentication identifier allows a payer to transfer funds to the payee without using the personal information;
generating, by the payer on a client computing device, a request to transfer a payment amount to the payee, wherein the request includes a second authentication identifier previously generated by the server;
receiving, from the payer, the request which includes the second authentication identifier;
upon successfully matching, by the server, the second authentication identifier with the first authentication identifier, extracting the payment account based on the first authentication identifier and transferring the payment amount to the payment account of the payee,
thereby enhancing security of the server by allowing the payee to avoid disclosing the personal information that results in the first or the second improper funds transfer.

22. A computer system for securely transferring funds to a payee having a bank account at a bank system and a payment account at a third party system, the computer system comprising:
a processor; and
a memory coupled to the processor and storing instructions, which when executed by the processor cause the processor to perform a method, the method comprising:

providing that the payment account of the payee at the third party system is coupled to the bank account of the payee at the bank system;

generating a first authentication identifier for the payee at the third party system, wherein an authentication identifier is a unique identifier generated for a respective payee and which:

prevents interception of a packet that contains personal information which, when disclosed, results in a first improper funds transfer; and prevents a subsequent replacement of the packet with inaccurate information which results in a second improper funds transfer, wherein the first authentication identifier is associated with the bank account of the payee and stored in the third party system, wherein the first authentication identifier indicates both the bank account and a corresponding payment account of the payee, and wherein the first authentication identifier allows a payer to transfer funds to the payee without using the personal information;

generating, by the payer, a request to transfer a payment amount to the payee, wherein the request includes a second authentication identifier previously generated by the server;

receiving, from the payer, the request including the second authentication identifier;

upon successfully matching the second authentication identifier with the first authentication identifier at the third party system, extracting the coupled bank account of the payee at the bank system and transferring the payment amount to the bank account of the payee, thereby enhancing security of the server by allowing the payee to avoid disclosing the personal information that results in the first or the second improper funds transfer.

* * * * *